United States Patent [19]

Chen

[11] Patent Number: 4,621,805
[45] Date of Patent: Nov. 11, 1986

[54] HANDLE STRUCTURE FOR AN EXERCYCLE

[76] Inventor: Yi S. Chen, No. 36, Alley 23, Lane 493, Sec. 3, Chung Shan Rd., Tan Tzu Hsiang, Taichung Hsien, Taiwan

[21] Appl. No.: 759,678

[22] Filed: Jul. 29, 1985

[51] Int. Cl.$^4$ .............. A63B 21/00; B62K 21/16
[52] U.S. Cl. ........................................ 272/73; 403/93
[58] Field of Search ............... 272/73; 280/47.37 R; 74/551.2, 551.3, 551.4, 551.5, 551.6, 551.7, 551.9; 403/87, 93

[56] References Cited

U.S. PATENT DOCUMENTS

| | | | |
|---|---|---|---|
| 593,943 | 11/1897 | Kingsland | 403/93 |
| 659,123 | 10/1900 | Bies | 74/551.4 |
| 4,257,588 | 3/1981 | Ketchman | 272/73 |
| 4,417,745 | 11/1983 | Shomo | 74/551.3 |

FOREIGN PATENT DOCUMENTS

| | | | |
|---|---|---|---|
| 14954 | of 1885 | United Kingdom | 74/551.3 |
| 3651 | of 1898 | United Kingdom | 74/551.4 |

*Primary Examiner*—Richard J. Apley
*Assistant Examiner*—S. R. Crow
*Attorney, Agent, or Firm*—Bacon & Thomas

[57] ABSTRACT

An improved handle structure for an exercycle including an angle-adjusting lever provided in a tube carried by a front rod of the exercycle. A pair of handle rods with handlebars are provided on both ends of the angle-adjusting lever and a locking bolt passes through the tube for engagement within a selected angle-adjusting hole of the angle-adjusting lever, thereby permitting the inclined angle of the handlebars to be adjusted to a desired position.

1 Claim, 6 Drawing Figures

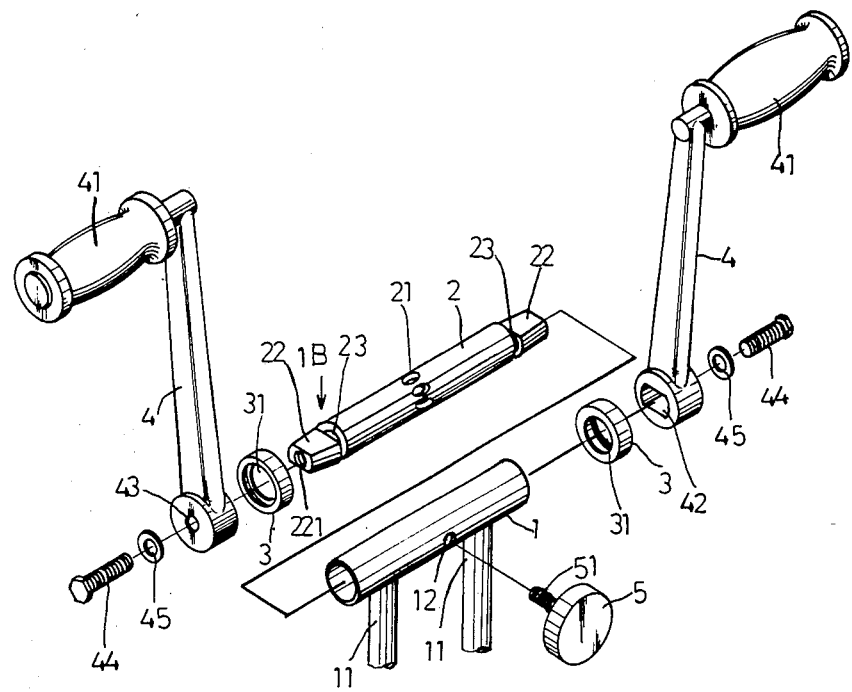
FIG.1-A
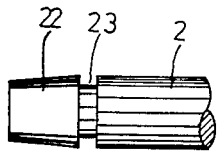
FIG.1-B

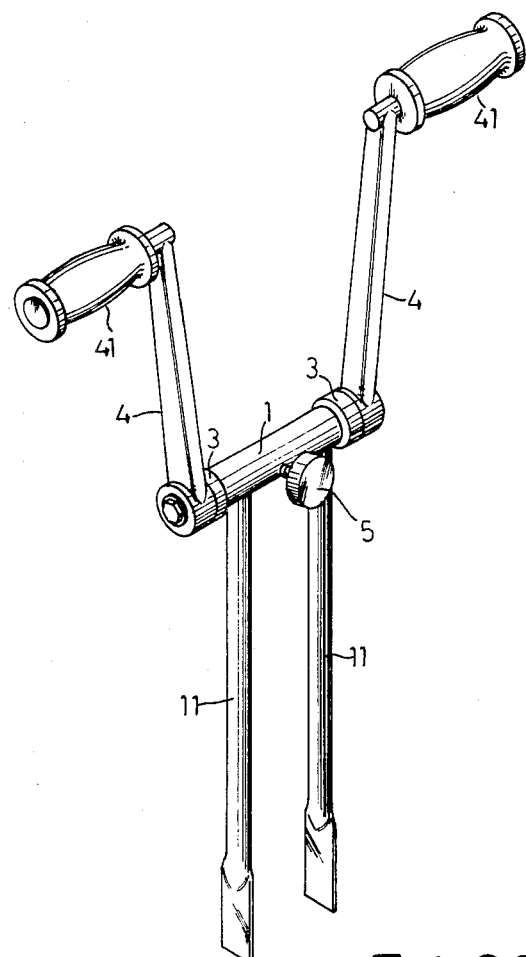
FIG.2-A
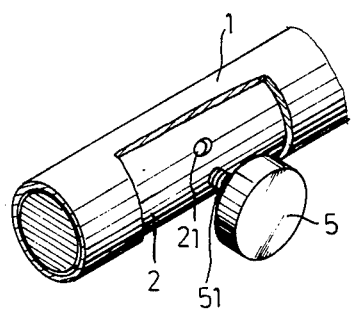
FIG.2-B

HANDLE STRUCTURE FOR AN EXERCYCLE

BACKGROUND OF THE INVENTION

The present invention relates to an exercycle defined by a stationary structure similar to that of a bicycle, which permits the user to step the pedals in place, thereby achieving healthy exercise.

To suit the users with different physical sizes, the conventional exercycles often have their saddle seat designed as a level-adjustable form. In this way, when a taller person uses the exercycle, he may adjust the saddle seat to a higher position, while a shorter person may adjust the saddle seat to a lower position. However, the handle bars of all the conventional exercycles cannot be adjusted in their inclinations. When the user with a shorter stature or shorter arms (for instance a child) uses the exercycle, he has to lean his body forward so as to grip the handle bars with his two hands. And when a user with a taller stature or longer arms uses the exercycle, his two arms have a retract back toward his body so that he can hold the handle bars with his hands. Therefore, the conventional exercycles are not suitable for the users (for instance all the members of a family) in different physical heights.

SUMMARY OF THE INVENTION

It is the primary object of the present invention to provide an improved handle structure for an exercycle wherein the angle-adjusted lever, the angle-adjusting hole, the locking bolt and the handle rods are combined so that the adjustable handlebars of the exercycle can be adjusted.

BRIEF DESCRIPTION OF THE DRAWINGS

FIG. 1-A is a fragmentary perspective view according to the present invention;

FIG. 1-B is a partial detailed view as viewed from the direction 1B of FIG. 1-A;

FIG. 2-A is an assembled view according to the present invention;

FIG. 2-B is an enlarged view of the part shown in FIG. 2-A;

DETAILED DESCRIPTION OF THE PREFERRED EMBODIMENT

Figure 3:
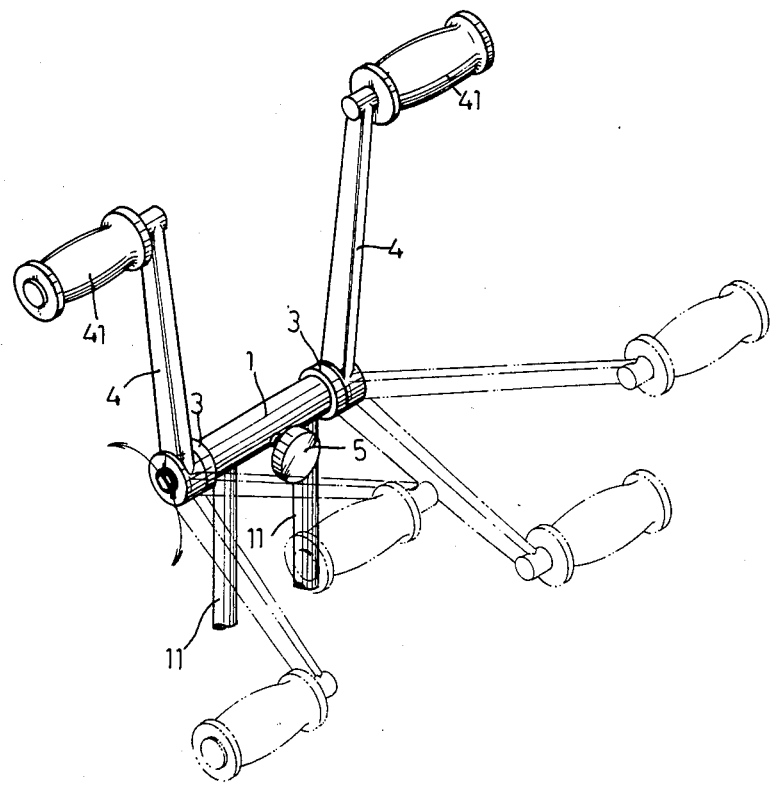
FIG. 3 is a view of the position of the adjusted handle bars according to the present invention.

Referring to the attached drawings, a tube (1) is fixed on the top of the front rods (11) of the exerciser, the front rods (11) being located in front of the saddle seat of the exercycle. The tube (1) is in a tubular form and a hole (12) is provided in the wall tube (1).

The angle-adjusting rod (2) is in an elongated rod with two symmetrical ends. Several angle-adjusting holes (21) are provided around the middle part of the angle-adjusting rod (2). A fixing block (22) is provided on each of the two ends of angle-adjusting rod (2) respectively and a threaded hole (221) is provided on the top of each of fixing blocks (22) respectively. As shown in FIG. 1-B, fixing blocks (22) are in a semiconical form with a larger end (i.e. the conical bottom) close to the angle-adjusting rod (2). A fixing slot (23) is provided between the fixing block (22) and the angle-adjusting rod (2). When angle-adjusting rod (2) is set into the tube (1), the fixing block (22) and the fixing slot (23) are located just outside the two ends of the tube (1), and one of the angle-adjusting holes (21) is aligned with the hole (12).

The fixing ring (3) is made of plastic material and the size of its annular hole (31) is the same as that of the fixing slot (23). The fixing ring (3) is inserted into the fixing slot (23). Since the fixing block (22) is of a semiconical form, this can make the fixing ring (3) easily slip thereon without removal therefrom. After the two fixing rings (3) have slipped on the two ends of the angle-adjusting rod (2), the angle-adjusting rod (2) is fixedly positioned in the tube (1), i.e. the angle-adjusting rod (2) will never get off from the two ends of the tube (1).

One end of the handle rod (4) is provided with a handle bar (41), while the other end is provided with a fixing slot (42). The upper and lower faces of the fixing block (22) are in a flat form such that the fixing block (22) can be inserted into the block-fixing slot (42). The hole (43) is communicable to the block-fixing slot (42), therefore the screw (44) passes through the washer (45) and the hole (43) to engage with the threaded hole (221) to secure the handle rod (4) with the angle-adjusting rod (2).

Figure 4:
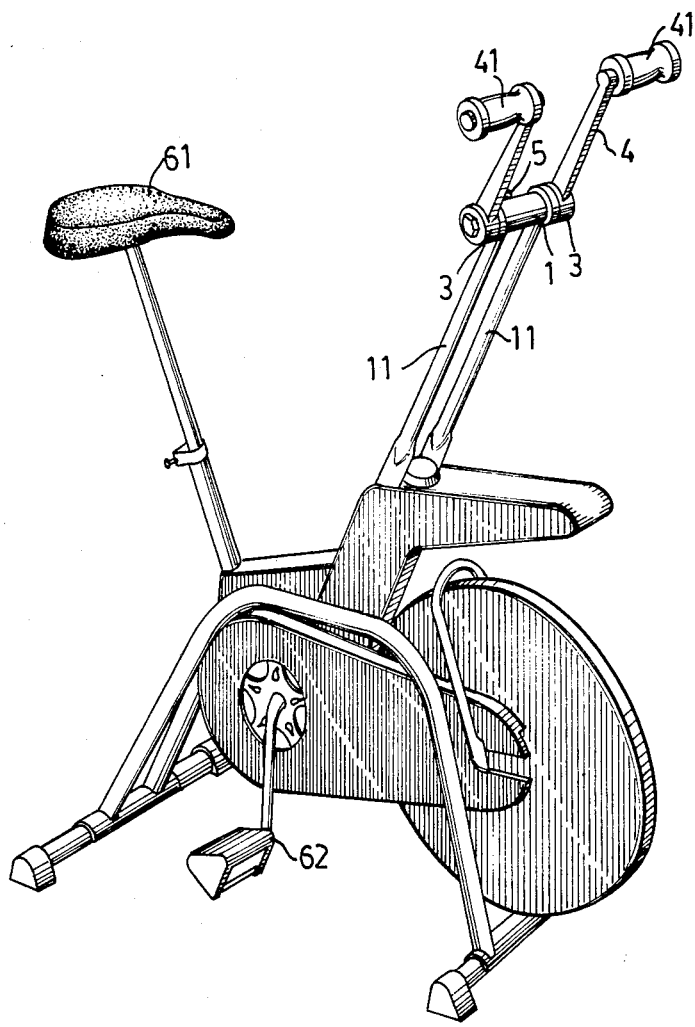
FIG. 4 is a preferred embodiment according to the present invention.

A bolt (51) is disposed on the locking bolt (5) and is screwed into the hole (12) to make the bolt (51) directly press against the bottom of the angle-adjusting hole (21) (as shown in FIG. 2-B), thus forming the assembly as shown in FIGS. 2 and 4.

The application and operation of the present invention are described as follows:

Referring now to FIG. 4, the exercycle according to the present invention permits the user to sit on the saddle seat (61) with his two feet stepping on the pedals (62) to achieve the physical exercising and body building effects. As shown in FIG. 3, when a user with a shorter stature and shorter arms intends to use the exercycle, he has to adjust the handle (41) to a place closer to the saddle seat (61), and when a user with a taller stature and longer arms intends to use the exercycle, he may adjust the handle (41) to a position further away from the saddle seat (61). The ways of such adjustment are described as follows:

As shown in FIGS. 2-A and 2-B, the locking bolt (5) is turned to make the bolt (51) get off the angle-adjusting hole (21), then the handle bar (4) can be pushed to make the angle-adjusting rod (2) rotate with respect to the rod tube (1), thus the handle (41) can be adjusted to any required position as shown in FIG. 3. After the adjustment reaches the required position, the locking bolt (5) is then turned to make the bolt (51) enter into the angle-adjusting hole (21), thus preventing the angle-adjusting rod (2) from rotating.

I claim:

1. An improved handle structure for an exercycle of the type including a saddle seat and front support means for supporting a pair of handlebars, which structure comprises:
   (a) a cylindrical tube carried by the front support means;
   (b) an angle-adjusting rod provided with a plurality of holes spaced around the central region thereof, with each end of the rod including a fixing block and a fixing slot disposed between the rod and the fixing block, the rod being receivable within the cylindrical tube;
   (c) a pair of fixing rings, each ring being engageable within a corresponding fixing slot of the angle-adjusting rod when the rod is disposed within the cylindrical tube;

(d) a pair of handle rods, each handle rod including a handlebar at one end and a handle slot at the other end, configured for receiving a corresponding fixing block; and (e) a locking bolt for passing through the cylindrical tube for selectively engaging any one of the holes in the angle-adjusting rod for securing the angle-adjusting rod relative to the tube, thereby permitting the handlebars to be selectively disposed in any one of plural different height positions.

* * * * *